United States Patent
Tsuda et al.

(10) Patent No.: US 6,251,016 B1
(45) Date of Patent: Jun. 26, 2001

(54) INFORMATION OFFERING SYSTEM FOR PROVIDING A LOTTERY ON A NETWORK

(75) Inventors: Kazuaki Tsuda; Hiroyuki Abe, both of Kawasaki; Izumi Muraki, Tokyo; Seiji Yoshizawa, Yokohama; Akitoshi Kaneko, Kawasaki, all of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 08/962,245

(22) Filed: Oct. 31, 1997

(30) Foreign Application Priority Data

Jan. 7, 1997 (JP) .................................................. 9-000993

(51) Int. Cl.⁷ ...................................................... A63F 9/24
(52) U.S. Cl. ................................ 463/42; 463/17; 463/41; 705/14
(58) Field of Search ...................... 463/16–19, 22, 463/41, 42; 379/88.02, 88.16, 88.24, 93.13; 273/269, 138.1, 139; 364/410.1, 411.1; 705/14, 5, 16

(56) References Cited

U.S. PATENT DOCUMENTS

| | | | |
|---|---|---|---|
| 4,764,666 | * | 8/1988 | Bergeron ................................ 463/17 |
| 5,083,271 | * | 1/1992 | Thacher et al. ...................... 364/411 |
| 5,280,426 | * | 1/1994 | Edmonds ............................... 463/42 |
| 5,327,485 | * | 7/1994 | Leaden ................................. 463/17 |
| 5,354,069 | * | 10/1994 | Guttman et al. ....................... 463/17 |
| 5,403,999 | * | 4/1995 | Entenmann et al. ................... 463/17 |
| 5,442,771 | * | 8/1995 | Filepp et al. ......................... 395/650 |
| 5,643,088 | * | 7/1997 | Vaughn et al. ........................ 463/40 |
| 5,713,795 | * | 2/1998 | Kohorn ................................ 463/17 |
| 5,740,549 | * | 4/1998 | Reilly et al. .......................... 705/14 |
| 5,774,170 | * | 6/1998 | Hite et al. ............................. 348/9 |
| 5,781,894 | * | 7/1998 | Petrecca et al. ....................... 705/14 |
| 5,791,990 | * | 8/1998 | Schroeder et al. ..................... 463/17 |
| 5,791,991 | * | 8/1998 | Small .................................... 463/41 |
| 5,796,952 | * | 8/1998 | Davis et al. ..................... 395/200.54 |
| 5,910,047 | * | 6/1999 | Scagnelli et al. ...................... 463/17 |
| 5,933,811 | * | 8/1999 | Angles et al. ......................... 705/14 |
| 5,948,061 | * | 9/1999 | Merriman et al. ................... 709/219 |
| 5,960,409 | * | 9/1999 | Wexler ................................. 705/14 |
| 5,986,651 | * | 11/1999 | Reber et al. ......................... 345/335 |
| 6,009,409 | * | 12/1999 | Adler et al. ........................... 705/14 |
| 6,026,368 | * | 8/1999 | Brown et al. ......................... 705/14 |
| 6,035,281 | * | 3/2000 | Crosskey et al. ..................... 705/14 |

\* cited by examiner

*Primary Examiner*—Mark Sager
*Assistant Examiner*—John M. Hotaling, II
(74) *Attorney, Agent, or Firm*—Staas & Halsey LLP

(57) ABSTRACT

A lottery on a network like the Internet can be more easily attained by preventing impersonation and validating participation. In a preferred embodiment, the opportunity to participate in the lottery is a reward for viewing an advertisement. When the advertisement is viewed a lottery ticket issuing number is displayed as an image file on the browser of the user viewing the advertisement. The image file is sent from the server providing the lottery service to the browser with HTML source to display the number. The image file on the lottery server is deleted after being sent, so that if the user requests re-display of the ticket issuing number display, the number cannot be obtained. The lottery server maintains a database of date and time stamped. requests for lottery ticket issuing numbers to prevent multiple requests during a single session. The user is requested to input the number displayed by the browser to find out whether it is a winning number. The lottery server maintains a file with predetermined lucky times that are compared with the time that the user input the number. The first user to input a lottery number at a time that is at least as late as one of the lucky times is a winner and a form is sent to the user's browser for sending the prize that is won.

6 Claims, 12 Drawing Sheets

FIG. 1A

HOME PAGE OF MR. A
WORLD OF JAZZ
· BILL EVANS (p)
· HANK MOBRAY (ts)
· . . .

ADVERTISEMENT Z

FIG. 1B

```
<html>
<head>
 . . .
<h1 align="right">
<a href="http://www.company-z.co.jp/jazz/index.htm"><img src="http://www.company-t.co.jp/adv/img01.gif"></a>
</h1>
</html>
```

FIG. 4

| SESSION ID | HTTP_REFERER |
|---|---|
| 679002 | http://www.tomato.company-a.co.jp/cde/lettuce.htm |
| 679051 | http://www.bacon.company-b.co.jp/cde/lettuce.htm |
| 680075 | http://www.beef.provider-a.or.jp/a01/pc01.htm |
| 680105 | http://www.chicken.provider-b.or.jp/b01/pc15.htm |
| 690013 | http://www.pork.provider-c.org/c01/pc05.htm |
| . . . . | . . . . . . . . . . . . . |

FIG. 5

SETTING OF ENTRANCE INFORMATION TO HOME PAGE

URL OF HOME PAGE: www.beef.provider-a.or.jp/a01/pc01.htm
KIND OF HOME PAGE: jazz

FIRST NAME: FUJI
SECOND NAME: TARO

E-MAIL: pc01@tomato.provider-a.or.jp

SUBMIT

FIG. 6 http://www.company-t.co.jp/adv/

| MANAGEMENT NO. | GIF FILE | BRANCHING DESTINATION |
|---|---|---|
| 0001 | img01.gif | http://www.company-z.co.jp/jazz/index.htm |
| 0002 | img02.gif | http://www.company-j.co.jp/pops/index.htm |
| 0003 | img03.gif | http://www.company-a.com/soccer/index.htm |
| . . | . . . . . | . . . . . . . . . . |

FIG. 8

HOME PAGE OF MR. A
WORLD OF JAZZ
 · BILL EVANS (p)
 · HANK MOBRAY (ts)
 . . . .
ADVERTISEMENT Z
11 : 25 : 21

CURRENT TIME: 11 : 25 : 22

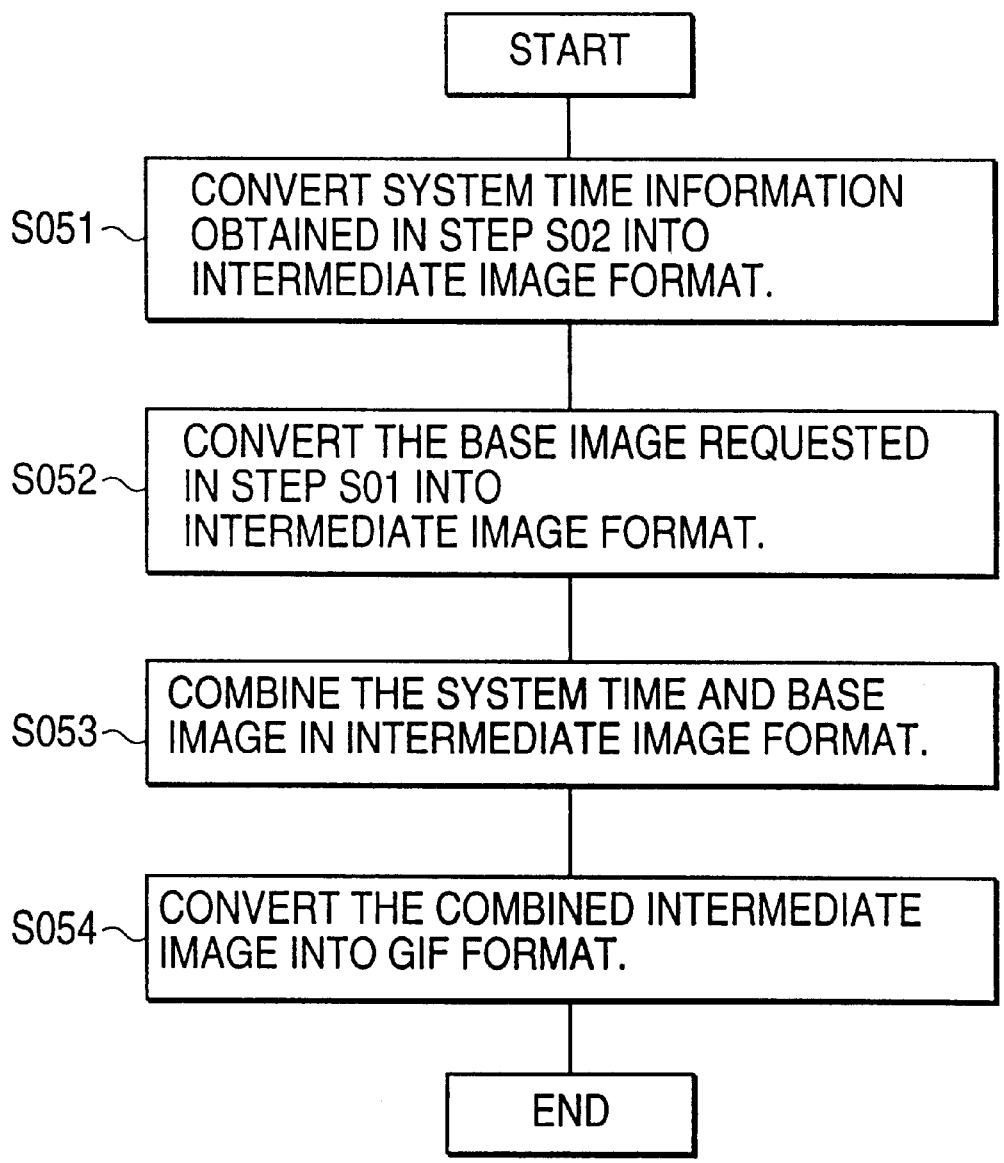

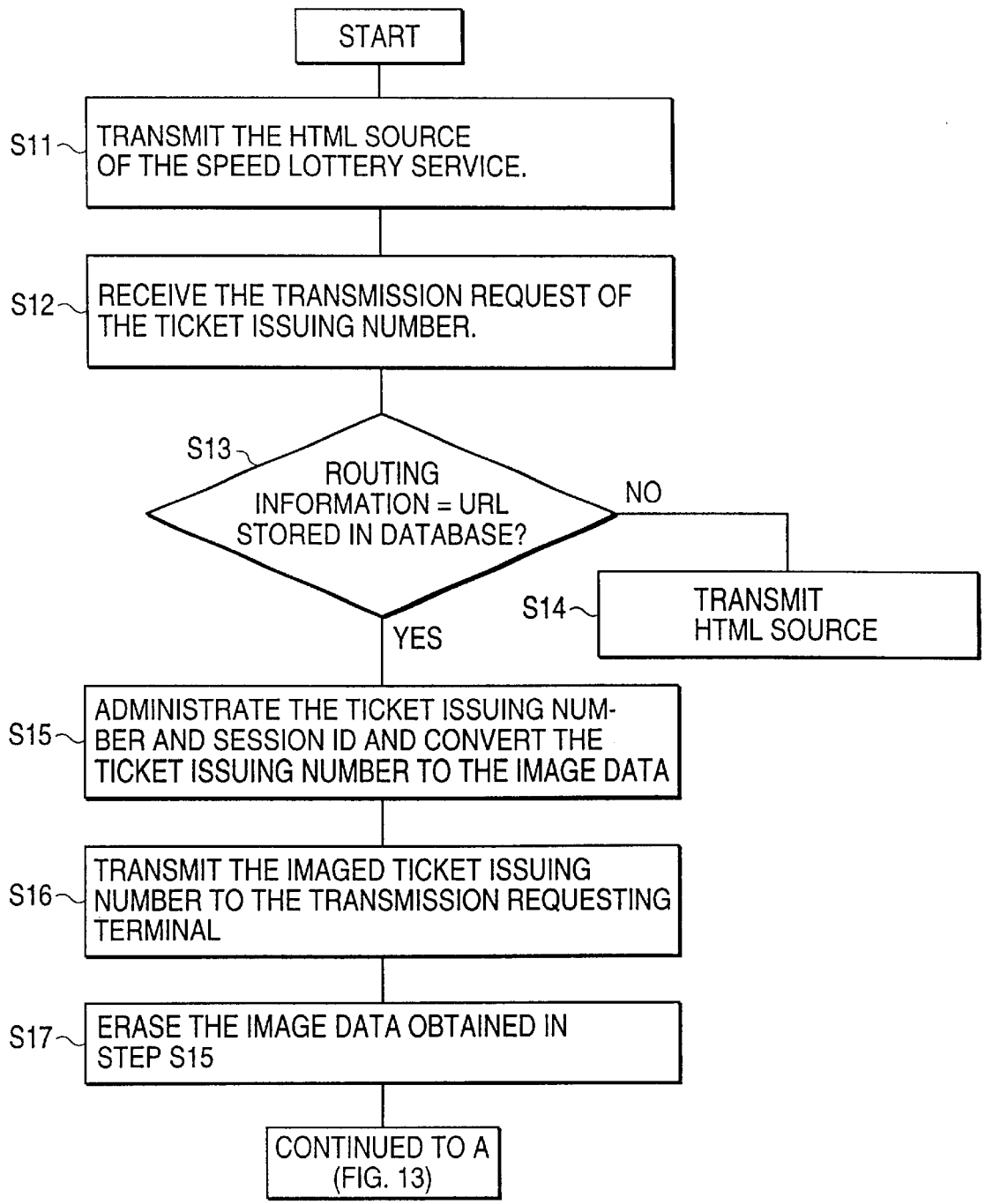

| SESSSION ID | HTTP_REFERER | TICKET ISSUING NUMBER | INPUT TIME |
|---|---|---|---|
| 679002 | http://www.provider-a.or.jp/a01/game01.htm | 58624 | 1996.12.28 17:35:12 |
| 679051 | http://www.provider-b.or.jp/b01/jazz.htm | 35689 | 1996.12.28 17:29:23 |
| 680075 | http://www.provider-b.or.jp/b01/jazz.htm | 75823 | 1996.12.28 17:42:17 |
| . . . | . . . . . . . . . | . . . . | . . . |

TICKET ISSUING NO.: 75823
(CODE DATA)

⇨

TICKET ISSUING NO.
(IMAGE DATA)

75823

FILE NAME: 680075. GIF

FIG. 12A

TICKET ISSUING NUMBER IS

75823

PLEASE INPUT THE TICKET ISSUING NUMBER.

[        ] [SUBMIT]

```
<html>
. . .
<h1>ticket issuing number is:
<img src=" http://company-t
. co.jp/adv/number.gif?6800
75">
. . .
. . .
</html>
```

FIG. 12C

TICKET ISSUING NUMBER IS x

PLEASE INPUT THE TICKET ISSUING NUMBER.

[        ] [SUBMIT]

```
<html>
. . .
<h1>ticket issuing number is:
<img src=" http://company-t
. co.jp/adv/number.gif?6800
75">
. . .
. . .
</html>
```

FIG. 14

DATABASE FOR LUCKY NUMBER ON DEC. 28, 1996

| MANAGEMENT NO. | LUCKY NO. (LUCKY TIME) | FLAG |
|---|---|---|
| 0001 | 12 : 04 : 53 | DETECTED |
| 0002 | 14 : 50 : 16 | DETECTED |
| 0003 | 17 : 42 : 16 | NOT DETECTED |
| 0004 | 19 : 16 : 20 | NOT DETECTED |
| . . . . | . . . . | NOT DETECTED |
| 0020 | 23 : 53 : 52 | NOT DETECTED |

FIG. 16

TOO BAD! YOU HAVE LOST!

HOWEVER, YOU HAVE YET A CHANCE.

PLEASE FILL THE FOLLOWING INPUT FORM AND MAIL IT. YOU WILL GET A WONDERFUL PRESENT AS ONE OF THE LUCKY TWENTY PERSONS EVERY WEEK.

NAME:
ADDRESS:
E-MAIL:
OCCUPATION:
AGE:
SEX:

SUBMIT

FIG. 17

CONGRATULATIONS! YOU HAVE WON.

YOU HAVE GOT AN ITEM FF.

PLEASE ENTER YOUR ADDRESS IN THE FOLLOWING INPUT FORM AND MAIL IT!

A PRESENT WILL BE SENT TO YOU AT THE END OF NEXT WEEK.

NAME:
ADDRESS:
E-MAIL:
OCCUPATION:
AGE:
SEX:

SUBMIT

INFORMATION OFFERING SYSTEM FOR PROVIDING A LOTTERY ON A NETWORK

CROSS REFERENCES TO RELATED APPLICATIONS

This application is based upon and claims priority from Japanese Patent Application 9-000993 filed Jan. 7, 1997, the contents of which are incorporated by reference herein.

BACKGROUND OF THE INVENTION

1. Field of the Invention

This application relates to an information offering system on the Internet, and in particular an information offering system including a lottery to induce offerors to register their home pages.

2. Description of the Related Art

One way of offering information on the Internet is by way of a company or private home page. Advertisers are beginning to notice the possibility of using a home page as an advertisement medium because a home page can attract many persons who are interested in the kinds of information offered.

It is becoming increasingly common to supply advertisement information about a product or service on the Internet by providing on the home page of an information offering service the company name of the product or service along with an image and profile. An interested consumer can go directly to the home page of the product or service by clicking on the image.

As an example, FIG. 1 shows the home page of Mr. A concerning jazz including an advertisement of the home page Z providing information about jazz. The left part of FIG. 1 represents a display realized on a computer by a browser which interprets the HTML format source at the right side of FIG. 1.

An advertisement section in FIG. 1 corresponds to the part inserted between the tags <h1 align="right"> and </h1>. This source has the following meaning. The image file designated by "img src=" indicates the location of the image file of advertisement Z displayed by the browser. The uniform resource locator (URL) designated by "a href=+ indicates the routing destination of the advertiser's home page to where the browser transfers when the image file of advertisement Z is clicked. Therefore, in this example, when the image file of the advertisement Z is clicked, the home page corresponding to the address "http:\\www.company-z.co.jp\jazz\index.htm" is retrieved.

One disadvantage of the above scheme is that the existing advertisement information can be copied easily by anyone who desires because such information is only image data. Moreover, it is also easy to change the routing destination when a user "clicks" on the relevant image data. Namely, a person can easily pretend to be the other person by copying the image file designated by "img src=", then rewriting the URL of the routing destination designated by "a href=", for example, into the URL of the impersonating person's own home page and then placing such URL on the Internet.

Therefore, it is also possible for a person to achieve an illegal purpose by pretending to be another person. A company could increase access to its own home page by posing as another company. In this way, an illegal profit could be obtained by, for example, posing as a competitor on an online shopping service. Similarly, a person could pose as another person or company and set the routing destination of the entrance information to an obscene home page, with the intention of causing the other person or company to lose its reputation.

For the reasons discussed above there is a need, regarding advertisements, to develop a technology to control such copying. Namely, even if literal copying is done for an illegal purpose, as explained above, a user cannot achieve such illegal purpose if it can be determined at a glance whether or not the image data and routing destination are genuine. Thereby, the reputation of the company which has presented the advertisement will not be damaged through illegal actions involving information available on the Internet.

On the other hand, when conducting an advertising business on the Internet, it is desirable to give incentives to present advertisements on home pages and to link to an advertised page after a home page has been accessed which presents an advertisement for the advertised page. The present invention provides a method of giving incentives by distributing lottery tickets and sending a prize to those who receive lucky numbers in the lottery. At this time, there has been no site where a speed lottery has been realized on the Internet.

In the above example of an advertisement, the present invention routes a user to a lottery ticket issuing page when the routing information has been processed. The address of the ticket issuing page is written directly into the HTML source of the advertising home page. The lucky number is then picked from the issued ticket issuing numbers.

However, Internet browsers are capable of storing the URL of the ticket issuing page as a bookmark. Therefore, there is a disadvantage in that a person could repeatedly obtain a lucky number without viewing an advertisement each time.

SUMMARY OF THE INVENTION

It is a first object of the present invention to determine whether an image file is a genuine file or a literally-copied file even if the advertisement (image file) on the Internet is literally-copied.

It is a second object of the present invention to prevent, in a lottery system on the Internet, repeatedly taking part in the ceremony for announcement of the lucky numbers using the same ticket issuing number by reloading of the ticket issuing page.

To attain the first object, the information offering system of the present invention provides information about advertisements on a computer network using a memory unit for storing advertisement information; a combining unit for combining, when an advertisement information transmission request is issued, information about the time of a transmission request for advertisement information; and a transmitting unit for transmitting requested information to the transmission requesting terminal.

To attain the second object, the information offering system of the present invention provides information about a lottery on a computer network using an issuing unit for issuing, when a lottery ticket issuing number information transmission request is issued, ticket issuing number information as code data for every identifier identifying communication with the transmission requesting terminal; a converting unit for converting the code data of the ticket issuing number information to image data presenting the ticket issuing number; and a transmitting unit for transmitting the ticket issuing number information to the transmission requesting terminal.

Moreover, in view of attaining the second object, the information offering system of the present invention provides information about a lottery to which ticket issuing numbers are distributed on a computer network, using a memory unit for storing the lucky numbers; a source transmitting unit for transmitting, when a lottery information transmission request is issued, computer code for obtaining input of the ticket issuing number to a transmission requesting terminal; a judging unit for judging whether the ticket issuing number is the lucky number depending on the input time and the lucky number of the input ticket issuing number; and a transmitting unit for transmitting the computer code corresponding to the judging result to the transmission requesting terminal.

BRIEF DESCRIPTION OF THE DRAWINGS

FIG. 1A is a display of a home page with an advertisement on the existing Internet.

FIG. 1B is HTML source that generates the display in FIG. 1A.

FIG. 4 is a data format diagram of the session management database for administrating a session.

FIG. 5 is a data format diagram of the registered database for administrating registered URLs.

FIG. 6 is a data format diagram of the advertisement information database for administrating the advertisement information.

FIG. 7 is a flowchart for combining the base image and system time.

FIG. 8 is a diagram showing a display of a home page with the advertisement information generated by the present invention, and current system time.

FIG. 9 is a flowchart of a second embodiment of the present invention.

FIG. 12A is a display for ticket issuing number input displayed by the browser of a user when acquired properly.

FIG. 12B is HTML source that generates the display in FIG. 12A.

FIG. 12C is a display for ticket issuing number input displayed by the browser of a user when acquired improperly.

FIG. 12D is HTML source that generates the display in FIG. 12C.

FIG. 14 is a data format diagram of the database for administrating the lucky numbers (using lucky times).

FIG. 16 is a display generated by a browser for ticket numbers other than the lucky number.

FIG. 17 is a display generated by a browser for the lucky numbers.

DESCRIPTION OF THE PREFERRED EMBODIMENTS

The preferred embodiments of the present invention will be explained with reference to FIG. 2 to FIG. 17.

Figure 2:
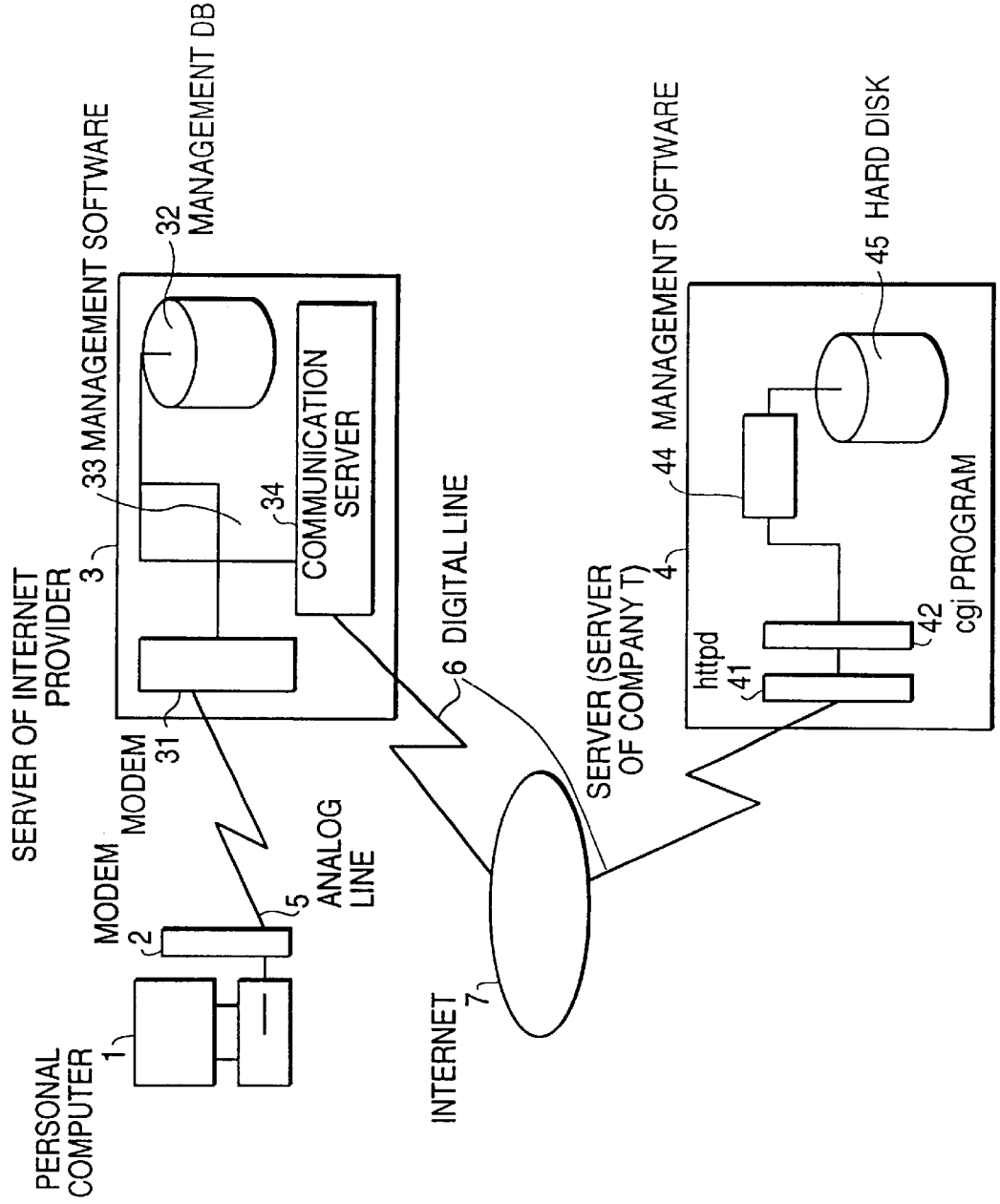
FIG. 2 is a system configuration diagram of a system which can implement the preferred embodiments of the present invention.

FIG. 2 is a system configuration diagram in relation to the preferred embodiments of the present invention. In FIG. 2, a personal computer 1 is connected by a modem 2 and an analog line 5, such as a telephone line, to a server 3 of an Internet provider having contracted with the owner of personal computer 1. In FIG. 2, the modem 2 is illustrated in a housing separate from the housing of personal computer 1, i.e., as an external modem, but the modem 2 may be in the same housing as personal computer 1, i.e., the modem 2 may be an internal modem. Alternatively, the connection between personal computer 1 and the server 3 may be by a digital line, such as an ISDN line and appropriate interfaces, such as a terminal adapter. The server 3 of the Internet provider is connected to the server 4 for offering information or service via the digital lines 6 (e.g., ISDN line) and Internet 7. The server 4 has installed therein the software in relation to the present invention.

The server 3 is composed of a modem 31 mediating communications with personal computer 1, a management database 32 for administrating the home page of persons who have contracted to have their home pages hosted by the server 3, management software 33 for administrating the management database and a communication server 34 for mediating communication with the Internet 7.

The server 4 is composed of a http demon (httpd) 41 and a cgi program 42. The httpd 41 administrates the server 4 and performs system control which should not be controlled directly by users. The cgi program 42 has a common gateway interface (cgi) and provides various kinds of services responding to requests from users.

The present invention may be implemented by the management software 44 and hard disk 45 or the management software 33 and management database 32. The present invention will be explained under the assumption that it is implemented by the management software 44 and hard disk 45. Therefore, it will be assumed that the server 4 provides the service of advertising on the Internet.

Figure 3:
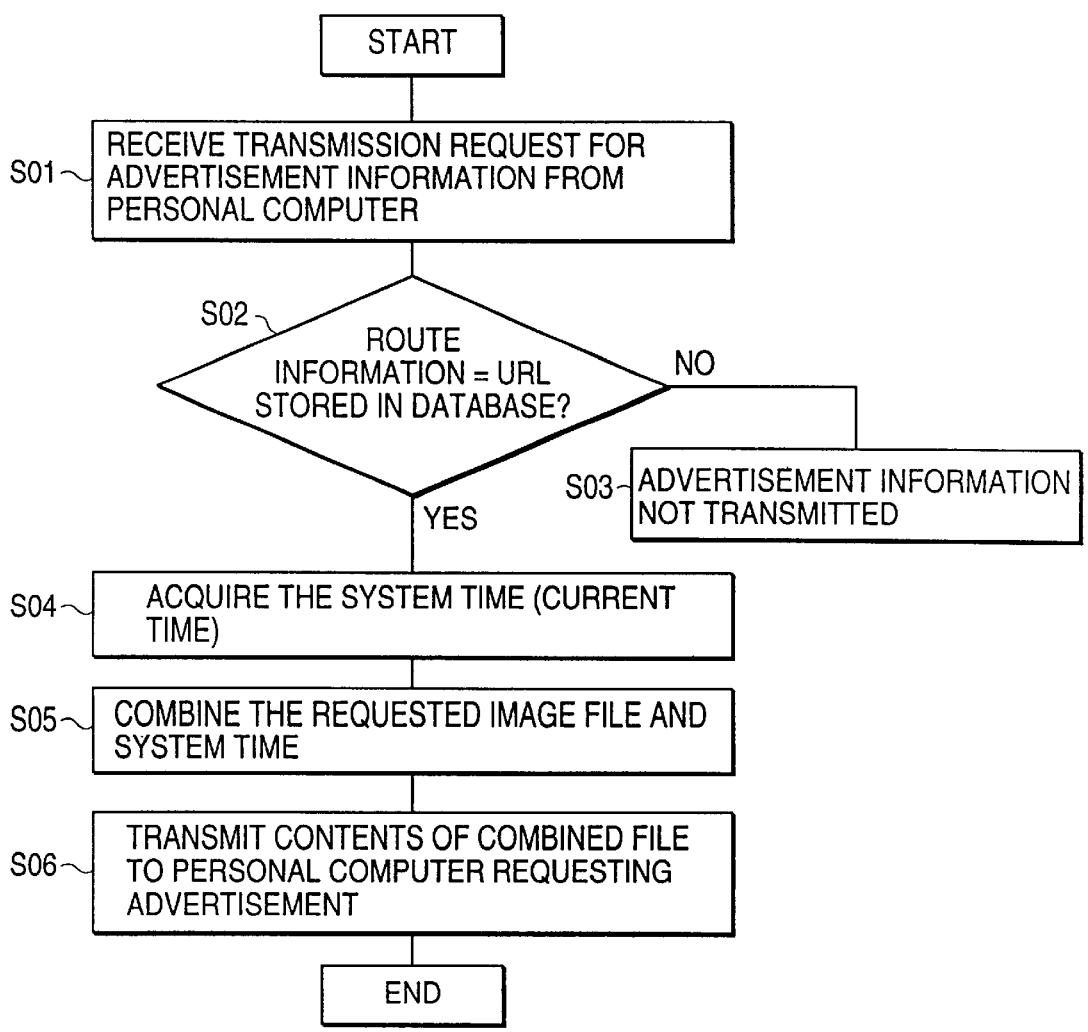
FIG. 3 is a flowchart of a first embodiment of the present invention.

FIG. 3 is a flowchart for explaining the first embodiment of the present invention. Operations of the present invention will be explained with reference to FIG. 3.

In step S01, while browsing the Internet, the owner of personal computer 1 makes access to the home page of Mr. A shown in FIG. 1A. The home page of Mr. A may be provided by the server 3 or by another server (not illustrated) connected via the Internet. The browser of personal computer 1 acquires the HTML source shown in FIG. 1B from the server hosting Mr. A's home page.

Since the information about an advertisement Z is included in the HTML source of Mr. A's home page, in step S01 the browser of personal computer 1 transmits a transmission request for a file designated by "img src=". In this example, the transmission request is sent to the server 4 where the advertisement information is stored. In this case, the browser of personal computer 1 also transmits the routing information to the server 4 indicating the home page displayed when the transmission request is generated. This routing information is generally substituted into the parameter HTTP_REFERRER and is then transmitted. The routing information in this example is the URL "http:\\www.provider-b.or.jp\b01\jazz.htm" of the home page of Mr. A.

A registered database (FIG. 5) is used to protect the advertisement information from those who try to illegally acquire the advertisement (image file). As shown in FIG. 5, each record in the registered database in hard disk 45 contains the URL of a home page having a link to an advertisement administrated by the server 4, the kind or type of home page, and information identifying the advertisement. When management software 44 of server 4 receives the transmission request, the management software 44 determines (step S02) whether the routing information in the transmission request exists in the registered database in hard disk 45. If there is no routing information in the registered database (FIG. 5) corresponding to the transmission request, i.e., if HTTP_REFERRER does not match one of the registered URLs in the database, in step S03 the management software 44 assumes the transmission request is an illegal request and does not transmit the advertisement information.

When the routing information in the transmission request matches an entry in the registered database (FIG. 5), the management software 44 begins processing the transmission request in step S04 by assigning a session ID for identifying the session. The session ID and routing information are stored as a pair in a session management database (FIG. 4) on the hard disk 45 by the management software 44.

In the illustrated example of FIG. 5, the routing information, (the URL of Mr. A's home page in HTTP_REFERER referenced in the transmission request of personal computer 1) is associated with management number "0002" in the registered database. The management software 44 assigns session ID "680075" to this transmission request and stores the session ID "680075" and the routing information as a pair in the session management database illustrated in FIG. 4.

Next, the management software 44 acquires the system time (current time) that the transmission request issued. Alternatively, the system time of receiving the transmission request may be acquired, but it may be considered the same as the transmission date and time information transmitted with the transmission request in the step S01.

In step S05, the management software 44 combines the advertisement information of the image file designated by the transmission request and the system time obtained in the step S04. This combining will be explained later.

The management software 44 administrates the advertisement information of clients that is available for presentation in the advertisement information database on the hard disk 45 as shown in FIG. 6. Each entry in the advertisement information database includes a pointer to an image file (e.g., a GIF format image file) and a URL which is the branching destination when a user clicks on the image created by the image file. Details of how the advertisement information database is administrated can be found in the U.S. patent application entitled INFORMATION OFFERING SYSTEM AUTOMATING REGISTRATION OF ADVERTISEMENT INFORMATION ON HOME PAGES, filed concurrently herewith and incorporated by reference herein.

In step S06, the management software 44 transmits the advertisement information combined in step S05 to personal computer 1 which is the transmission requesting terminal. The browser of personal computer 1 displays the advertisement information received at a position designated on the basis of the HTML source (see FIG. 8).

Next, combining of the advertisement information (hereinafter referred to as "base image") in step S05 of FIG. 3 and the system time will be explained with reference to FIG. 7. The system time (code data) and base image (GIF format) are not easily combined as explained hereunder because of differences in how each is stored.

In step S051, the management software 44 converts the system time (code data) obtained in step S04 into an intermediate image format for combining with the base image.

In step S052, the management software 44 acquires the base image based on the file name designated by the advertisement information and register databases, and the transmission request. The management software 44 converts the base image (GIF format) obtained into the intermediate image format for combining with the system time.

In step S053, the management software 44 combines the system time and base image in intermediate image format to form a combined intermediate image. In step S054, the combined intermediate image is converted into a display advertisement in GIF format. Thus, in the combining method explained above, the advertisement information in GIF format is combined with the system time in a different format to produce verifiable advertisement information.

FIG. 8 is a diagram for explaining the verifiable advertisement information generated by the present invention. FIG. 8 indicates the display produced by the browser of personal computer 1 after receiving the verifiable advertisement information or display advertisement transmitted in step S06 of FIG. 3. As shown in FIG. 8 the advertisement Z shows the time "11:25:21" which is when the server received the transmission request for the advertisement Z. Meanwhile, a user of personal computer 1 sees the display contents of the browser at 11:25:22 (current time). The difference between these times results from the time required to combine and transmit the verifiable advertisement information by the server 4.

As explained above, the advertisement information administrated by the server of the present invention is combined with a time equal to the current time of display on personal computer 1 minus the time. difference, namely a time near the current time. Therefore, if a person attempts to pose as another person by copying the display advertisement, i.e., the advertisement information combined with the time the request for the advertisement was received by the server 4, this attempt will be detected because the time displayed in the copy of the display advertisement will not be close to the current time of the home page containing the copy of the display advertisement. Since the display advertisement (verifiable advertisement information) is in GIF format, the illegal copier of the display advertisement would have to edit the GIF image and insert a new system time to simulate the operation of the management software 44.

Additional reliability of the advertisement information can be obtained if the person responsible for administration of server checks the identity of the person requesting the advertisement when the advertisement is registered in the server 4. Specifically, the administrator of the server has the person making a request present a certification of the company where he or she works or a certification of the product made or sold by that person's company. The administrator then checks the identity of the certification to determine if the company name displayed on the advertisement information is the same as the company name in the certification or, alternatively, that the product name displayed on the advertisement information is the same as the product name in the certification.

Next, the second embodiment of the present invention will be explained. FIG. 9 is a flowchart for explaining the second embodiment of the present invention.

According to the present invention, the user of personal computer 1 can access the home page of a speed lottery service in server 4, by clicking on the display advertisement on the home page in server 3 generated using advertisement information administrated by server 4. In step S11, the server 4 receives from the browser of personal computer 1 an HTML source transmission request for the speed lottery service home page and routing information about the home page currently displayed by the browser. The management software 44 of server 4 receives the transmission request and assigns the session ID "680075" to identify this session. Thereafter, the management software 44 transmits the HTML source on the hard disk 45 to personal computer 1.

Based on the HTML source received in Step S11, the browser of personal computer 1 sends to the server 4 a transmission request for an image file in GIF format that will provide a description of a ticket issuing number. In step S12, the server 4 receives the transmission request for the GIF image file for displaying the ticket issuing number.

In step S13, the management software 44 determines whether the routing information received in step S11 matches a URL in the registered database (FIG. 5) administrated in the hard disk 45. Namely, the management software 44 determines whether the request for a ticket issuing number is from a browser displaying a home page which is recorded as having received advertisement information administrated in the server 4.

In step S14, when the routing information (URL) is determined to be not in the registered database, the management software 44 transmits HTML source to the requesting terminal (personal computer 1) which will cause the browser to display an appropriate message. In this case, the management software 44 does not transmit the GIF file for displaying the ticket issuing number to the requesting terminal (personal computer 1).

In step S15, when the routing information (URL) is found in the registered database, the management software 44 assigns a ticket issuing number (code data) such as "75823" generated by a random number generator to the session ID, in this case "680075". The management software 44 administrates the session ID, ticket issuing number (code data) and routing information in a ticket management database on the hard disk 45.

Figures 10, 11:
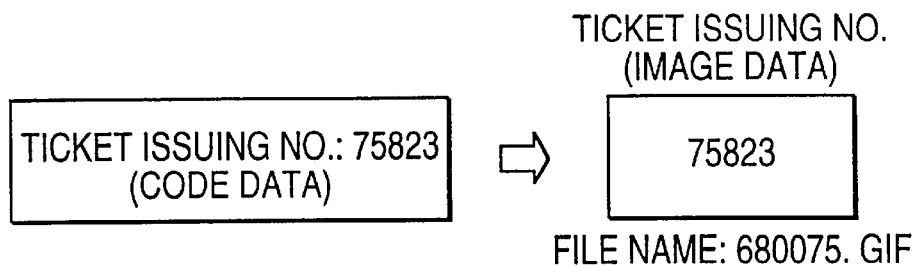
FIG. 10 is a data format diagram of the ticket management database for administrating ticket issuing numbers and session IDs.
FIG. 11 is a data conversion diagram showing conversion of code data of the ticket issuing number into image data.

FIG. 10 is a data format diagram of the ticket management database having records containing the session ID, routing information, ticket issuing number and input time. As indicated in FIG. 10 the ticket issuing number for the session ID "680075" is "75823". The input time will be explained below.

The management software 44 converts the code data indicating the ticket issuing number into GIF format image data for displaying the ticket issuing number as illustrated in FIG. 11. The management software 44 designates the file name of the GIF format image data as the session ID followed by ".GIF" or in this example "680075.GIF".

FIG. 11 is a diagram depicting conversion by the management software 44 of the code data indicating the ticket issuing number, e.g., a binary integer representation, into image data in the GIF format for displaying the ticket issuing number. Such conversion is known in the related art and a detailed explanation will be omitted here.

In step S16 of the flowchart in FIG. 9, the management software 44 transmits, to personal computer 1, the GIF file for displaying the ticket issuing number obtained in step S15, e.g., the file "680075.GIF". The browser running on personal computer 1 displays this GIF file in the position designated by the HTML source received in step S11, as illustrated in FIG. 12A.

FIG. 12A shows the ticket issuing number input display generated by the browser on personal computer 1, while FIG. 12B shows the HTML source that generates the display. As illustrated in FIG. 12A, the ticket issuing number given to the this session is "75823".

This ticket issuing number is a GIF format image file as explained above. Moreover, if a user observes the HTML source of the relevant display, he can see only a program name (number.gif) for determining the GIF file name and an argument ("680075") but cannot find the ticket issuing number.

In step S17, after the management software 44 transmits the GIF file for displaying the ticket issuing number in step S16, the GIF file (session ID.GIF, e.g., "680075.GIF") is erased.

Accordingly, one ticket issuing number is guaranteed to be generated only once for each session ID. Namely, when a user of personal computer 1 has reloaded the display of the ticket issuing number, the browser of personal computer 1 does not display FIG. 12A but rather FIG. 12C. The browser on personal computer 1 cannot again obtain the GIF file for displaying the ticket issuing number from the server 4, because the GIF file has been erased. Furthermore, since the session ID already has an associated ticket issuing number in the ticket management database illustrated in FIG. 10 and the session ID.GIF file has been erased, the server 4 transmits a GIF file (see FIG. 12C) indicating that the session has performed an improper operation in place of the GIF file for displaying the ticket issuing number even though the HTML source code (see FIG. 12D) is the same as the HTML source code (see FIG. 12B) that generated the display illustrated in FIG. 12A.

Figure 13:
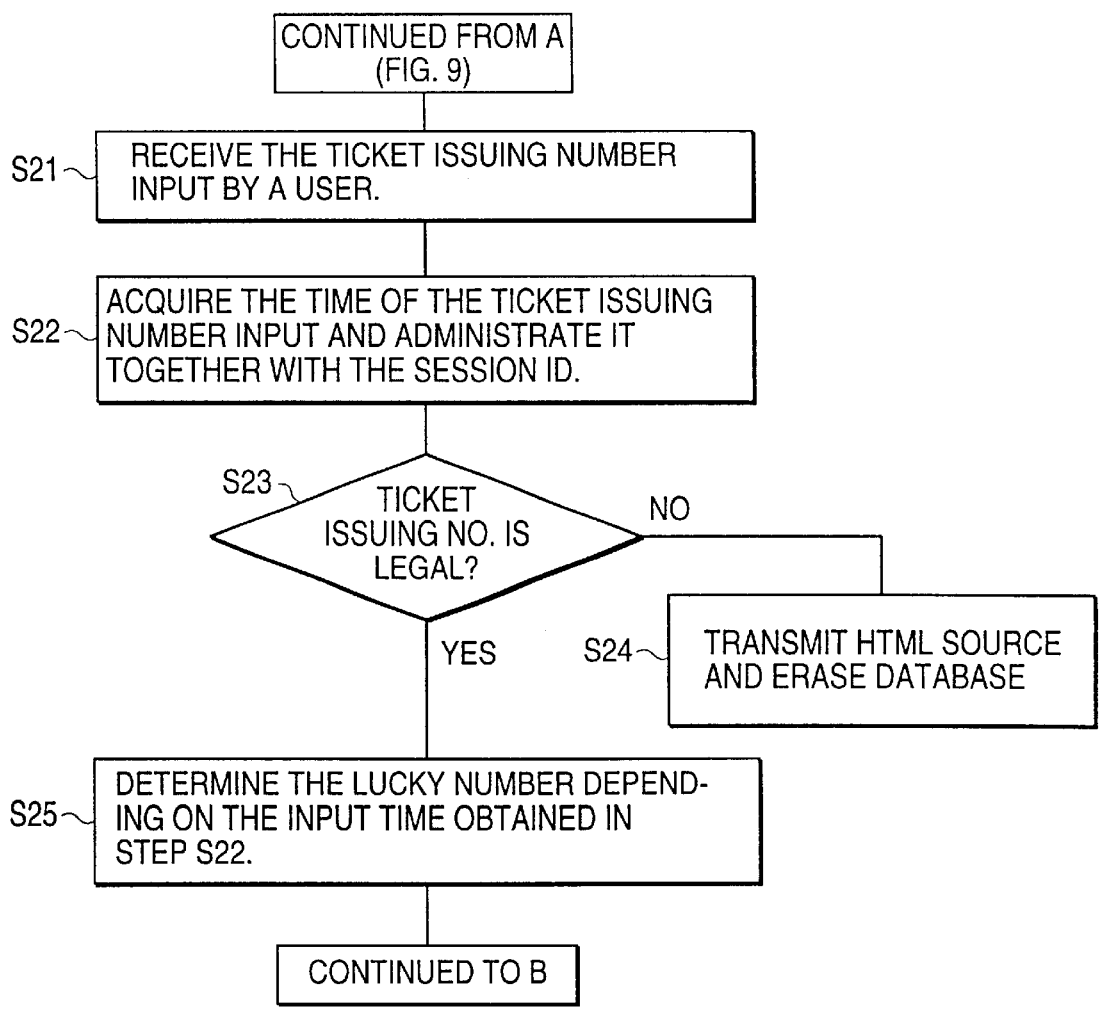
FIG. 13 is a flowchart of operations for validation of ticket issuing numbers and selection of lucky numbers in the lottery.

FIG. 13 is a flowchart of operations for validation of ticket issuing numbers and selection of lucky numbers in the lottery. FIG. 13 is a continuation of FIG. 9 as indicated on FIGS. 9 and 13. The browser of personal computer 1 is still generating the display of illustrated in FIG. 12A which at the bottom requests input of the ticket issuing number by the users.

In step S21, a user inputs, responding to the request, the number "75823" (code data), same as the ticket issuing number (image data) displayed by the browser. The browser of personal computer 1 transmits the ticket issuing number input by the user to the server 4 together with the session ID. The management 10 software 44 receives the ticket issuing number and session ID.

In step S22, the management software 44 obtains the system time of server 4 stored in the ticket management database (FIG. 10) corresponding to the session ID (FIG. 10). FIG. 10 indicates that the ticket issuing number input time of the session ID "680075" is "1996.12.28, 17:42:17".

In step S23, the management software 44 determines whether the ticket issuing number corresponding to session ID "680075" in the ticket management database which was stored in step S15 of FIG. 9 is the same as the ticket issuing number received from the user in step S21 of FIG. 13.

In step S24, when the ticket issuing numbers do not match, the management software 44 transmits HTML source to the transmission requesting terminal (personal computer 1) to inform the user, and the database entries for the session ID ("680075" in this case) are erased.

In step S25, when the ticket issuing numbers match, the management software 44 determines whether the ticket issuing number is the lucky number depending on the input time obtained in step S22 of FIG. 13.

In this example, the management software 44 determines that the ticket issuing number "75823" received from the user in step S21 of FIG. 13 matches the ticket issuing number "75823" for the session ID "680075" in the ticket management database (FIG. 10). Therefore, this example indicates that the ticket issuing number is a valid number. The management software 44 determines whether the ticket issuing number is the lucky number depending on the system time stored for the session ID "680075" in the ticket management database (FIG. 10).

FIG. 14 is a data format diagram of the database administrated for the lucky numbers or lucky times. The database illustrated in FIG. 14 shows lucky numbers of the date 1996.12.28 (Dec. 28, 1996) and such lucky numbers are provided for every day.

As indicated in FIG. 14, there are 20 lucky numbers for the date, 1996.12.28 and the lucky times are "12:04:53", "14:50:16", 117:42:16", etc. Moreover, FIG. 14 also indicates that the lucky numbers have already been detected for the lucky times "12:04:53" and 14:50:16", but no lucky number has been detected for the lucky time "17:42:16" and the subsequent lucky times.

Figure 15:
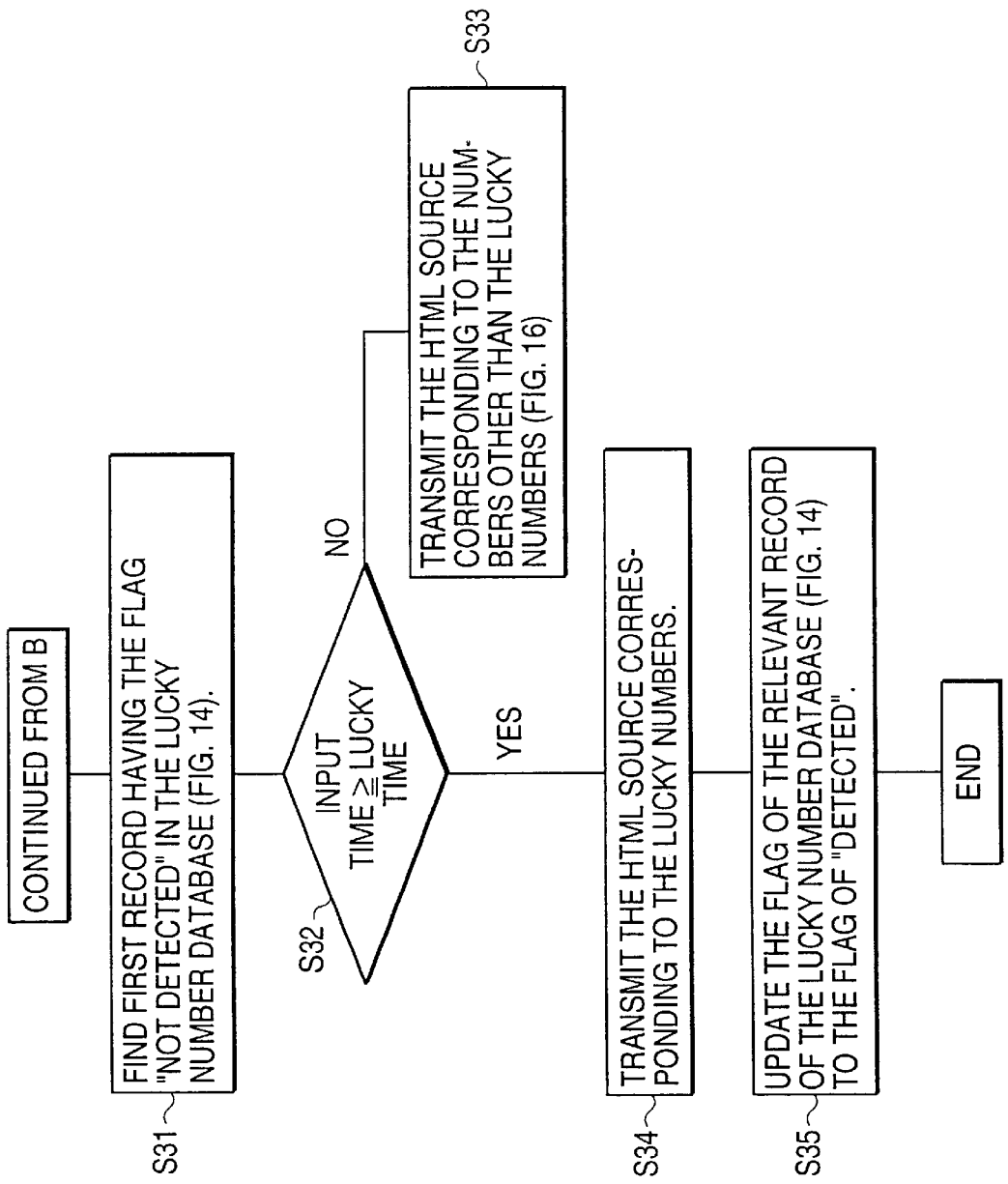
FIG. 15 is a flowchart of operations performed to select the lucky numbers.

The lucky number database illustrated in FIG. 14 can be found in the hard disk 45 of the server 4. FIG. 15 is a flowchart of the operations for determining the lucky numbers. With reference to FIG. 14 and FIG. 15, operations of the management software 44 will be explained.

In step S31, the management software 44 retrieves the lucky number database (FIG. 14) for the input date. The management software 44 refers to the first record of the lucky number database having the flag "not detected". In this case, the management software 44 finds that the first record with the flag "not detected" has the management number "0003".

In step S32, the management software 44 extracts the input time "1996.12.28, 17:42:17" for the session Id "680075" from the ticket management database (FIG. 10). Then, the management software 44 determines whether the input time is later than the lucky time of the record found in the step S31.

In step S33, when the input time is earlier than the lucky time, the management software 44 transmits to the requesting terminal identified by the session ID, the HTML source that will produce the display for the numbers other than the lucky numbers, as illustrated in FIG. 16. As illustrated in FIG. 16, persons receiving numbers other than the lucky numbers may receive another chance to get a prize by mailing a form after entering the specified items. A user can transmit the specified items to the server 4 by clicking the submit button after entering the specified items.

In step S34, when the input time is determined to be later than or the same as the lucky time, the management software 44 transmits to the requesting terminal identified by the session ID, the HTML source that will produce the display for the lucky number, as illustrated in FIG. 17.

In the case of the session ID "680075", since the input time "17:42:17" is larger than the lucky time "17:42:16", the management software 44 transmits the HTML source corresponding to the lucky number to personal computer 1 identified by the session ID "680075".

For the lucky numbers of the lottery, FIG. 17 shows a display requesting input of a delivery address for the prize. A user transmits the specified items to the server 4 by entering the specified items and then clicking the submit button.

In above explanation, the present invention is installed in the server 4, but the present invention can naturally be stored in a memory medium before it is installed on a server. In this case, the memory medium includes means corresponding to the management software 44. However, when the program recorded on the memory medium is installed on a server, it operates as explained above, so the explanation is not repeated here.

The present invention provides the following effects. The first effect is that even when an advertisement (image file) on the Internet is literally copied, it is very easy to determine whether the image file is the genuine file or a literal copy.

The second effect is that participation in a lottery for lucky numbers on the Internet several times with the same ticket issuing number through reloading of the ticket issuing page can be prevented.

What is claimed is:

1. A server computer connectable to at least one consumer computer, comprising:

a management unit to manage advertisement information;

a combining unit, coupled to said management unit, to produce combined advertisement information by adding time information onto requested advertisement information from said management unit, the time information concerning when the requested advertisement information is requested; and a sending unit, coupled to said combining unit, to send the advertisement information to a consumer computer for display of the combined advertisement information at the consumer computer with the time information on the requested advertisement information.

2. A server computer according to claim 1, wherein the time information indicates when said server computer receives a request for the requested advertisement information from the consumer computer.

3. A server computer according to claim 1, wherein said management unit includes a database unit to store network resource identifiers corresponding to the advertisement information to be combined with resources identified by the network resource identifiers, and wherein said server further comprises an activating unit, coupled to said combining unit, to activate said combining unit when the request includes routing information matching one of the network resource identifiers in said database unit.

4. A server computer according to claim 3, wherein the time information indicates when said server computer receives a request for the requested advertisement information from the consumer computer.

5. A consumer computer connectable to a server computer, comprising:

a requesting unit to request advertisement information from the server computer based on tag information in first source used to generate a first display;

a receiving unit to receive combined advertisement information with time information indicating when the consumer computer requested the advertisement information; and a display unit, coupled to said receiving unit, to produce a second display based on second source containing the combined advertisement information with the time information on the advertisement information.

6. A computer readable storage controlling a server computer and storing a process comprising:

managing advertisement information;

combining time information with the advertisement information to produce combined advertisement information with the time information on the advertisement information, the time information indicating when a consumer computer requests the advertisement information from the server computer; and sending the combined advertisement information to the consumer computer.

* * * * *